United States Patent
Farrow, Jr. et al.

[11] Patent Number: 5,404,671
[45] Date of Patent: Apr. 11, 1995

[54] SOD

[75] Inventors: William H. Farrow, Jr., Wilmington; Vijayendra Kumar, New Castle; William H. Mitchell, Newark, all of Del.

[73] Assignee: E. I. Du Pont de Nemours and Company, Wilmington, Del.

[21] Appl. No.: 141,186

[22] Filed: Oct. 27, 1993

[51] Int. Cl.6 .................................................. A01C 1/04
[52] U.S. Cl. ........................................ 47/1.01; 47/56; 47/58; 405/258
[58] Field of Search ...................... 47/1 F, 56; 405/258

[56] References Cited

U.S. PATENT DOCUMENTS

| | | | |
|---|---|---|---|
| 4,232,481 | 11/1980 | Chamoulaud | 47/56 |
| 4,662,946 | 5/1987 | Mercer | 405/258 |
| 4,720,935 | 1/1988 | Rogers et al. | 47/56 |
| 4,790,691 | 12/1988 | Freed | 405/263 |
| 4,819,933 | 4/1989 | Armond | 272/3 |
| 4,867,614 | 9/1989 | Freed | 405/263 |
| 4,916,855 | 4/1990 | Halliday | 47/56 |
| 5,014,462 | 5/1991 | Malmgren et al. | 47/1.01 |
| 5,177,898 | 1/1993 | Decker | 47/56 |
| 5,189,833 | 3/1993 | Clark | 47/56 |
| 5,224,290 | 7/1993 | Molnar et al. | 47/56 |

FOREIGN PATENT DOCUMENTS

| | | | |
|---|---|---|---|
| 896030 | 6/1983 | Belgium . | |
| 204381 | 12/1986 | European Pat. Off. | 47/1 F |
| 2522864 | 12/1976 | Germany | 47/1 F |
| 2244988A | 12/1991 | United Kingdom | 47/DIG. 13 |

OTHER PUBLICATIONS

"Compost Use in Sod Production", Biocycle, Mar. 1991, pp. 64–65.

*Primary Examiner*—Henry E. Raduazo

[57] ABSTRACT

A novel multi-layer sod and the method for making said sod is disclosed. The sod contains recycled waste products including pieces of carpet and compost.

11 Claims, 1 Drawing Sheet

SOD

FIELD OF THE INVENTION

This invention relates generally to sod production and more particularly relates to a sod produced from recycled waste materials.

BACKGROUND OF THE INVENTION

A significant relationship exists between the frequency of occurrence of certain types of sports player injuries and the quality of a playing surface. It is generally accepted that playing surface quality is primarily a function of turfgrass density and growth. A dense growth of turfgrass is thought to provide a cushioning effect that improves players' safety. The soil or other growing medium on which turfgrass is grown is not generally considered a significant factor, per se, in achieving this cushioning effect, although it is well recognized that increased soil moisture softens the soil in addition to enhancing turfgrass growth. Excess moisture, however, can cause reduced traction and, if severe, poor root growth and loss of stand density (number of plants per unit area).

The ultimate turfgrass sod for use on athletic fields and other areas where heavy wear stress is anticipated would include, as a minimum, the following characteristics: (1) a minimum water infiltration rate of 8 to 10 inches per hour, (2) high resiliency, (3) a minimum available water holding capacity of 10 weight % (based on sod dry weight), (4) a source of slow-release plant nutrients, (5) a dense root matrix for sod integrity and resistance to divot removal and/or sod tearing and (6) a dense growth of well adapted turfgrass species. Many of these sod characteristics would also be useful for other types of plants such as flowers.

SUMMARY OF THE INVENTION

Accordingly, it is an object of the present invention to provide a sod having a minimum water infiltration rate of at least 8 inches per hour, high resiliency, a minimum available water holding capacity of 10%, a source of slow-release plant nutrients, a dense root matrix for sod integrity and a dense growth of well adapted grass or other plants.

The invention described and discussed herein involves a sod and a sod production system which utilizes recycled waste products. Recycled shredded carpet pieces and municipal or other high quality compost are critical components of the system. Minor amounts of soil, sand or other materials can be added to the system depending on local supplies and conditions.

The present invention is a multi-layer sod. The bottom or first layer is comprised of a mixture of carpet pieces and compost. The second layer is comprised of compost. The second layer of compost is spread over the first layer of carpet pieces and compost to at least a depth whereby any pieces of carpet extending upward from the first layer are covered by compost. A plurality of plants grow in the second layer. The plants' roots penetrate into the first layer and entangle the carpet pieces, thus forming a dense root matrix sod.

The sod of the present invention is made by first placing a first or bottom layer comprising a mixture of carpet pieces and compost onto a root impervious barrier. A second layer comprised of compost is then placed over the first layer to at least a depth whereby any pieces of carpet extending upward from the first layer are covered by compost. Viable seeds, seedlings, rooted cuttings, root divisions or plant plugs are placed in the second layer. In the case of turfgrass sod, the second layer is seeded with the appropriate adapted grass seed for the region and for the intended end use. Plants are permitted to grow by the repeated steps of watering and, in the case of turfgrass, mowing for a period of time. During this time, the plants' roots penetrate into the first layer and entangle the carpet pieces as the plants grow. Finally, the sod is harvested.

DETAILED DESCRIPTION OF THE INVENTION

Figure 1:
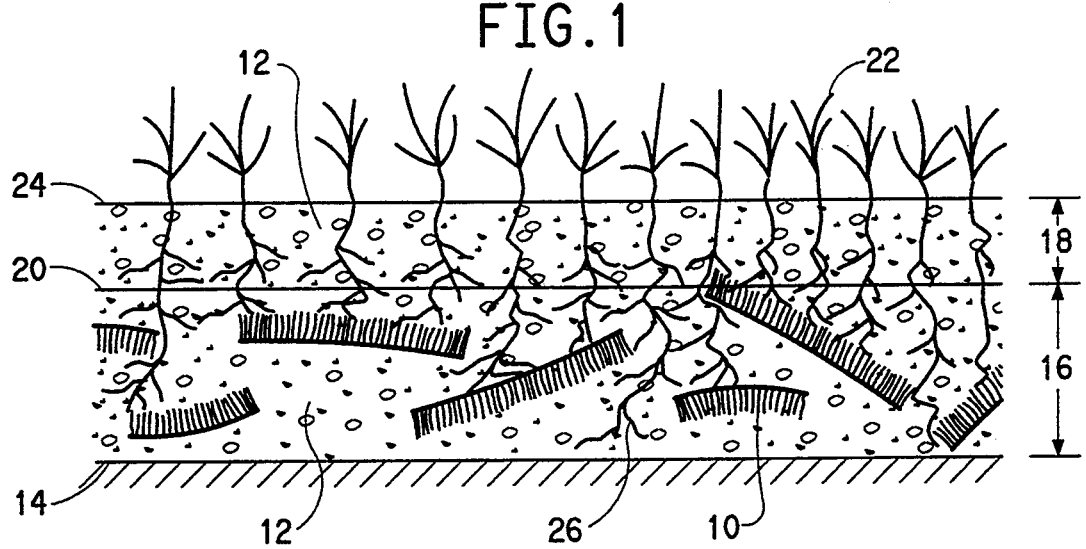
FIG. 1 is a cross-sectional view of one embodiment of this invention.

FIG. 1 depicts an embodiment of this invention, namely turfgrass sod, prior to harvesting. It should be understood that this invention is not limited to turfgrass sod. Other plants, such as flowers or vegetables, may be substituted for grass.

Referring to FIG. 1, a mixture comprised of carpet pieces 10 and compost 12 is placed on a root impervious barrier 14 (such as concrete or a plastic film) to a depth 16 forming a first layer. A second layer comprised of compost 12 and having a depth 18 is placed over the first layer. The depth 18 of the second layer must be at least large enough to cover any carpet pieces which extend upward above the top 20 of the first layer. Grass plants 22 grow from the top 24 of the second layer. Roots 26 of the grass plants extend throughout the first and second layers, entangling the carpet pieces.

The carpet pieces and compost mixture serves as a superior growing medium for plants, especially turfgrass, while providing a resiliency that is seldom found in native soil. Carpet pieces become entwined with roots producing a root-media matrix that has superior integrity.

Carpet pieces suitable for use in this invention are from about ½ inch to about one inch in width and from one inch to about five inches in length. Longer pieces become entangled with each other, are difficult to mix with compost and do not easily spread into a layer. Shorter pieces do not improve sod durability. Pieces are kept to a maximum width of about one inch in order to prevent drying of the growing media since carpet pieces are somewhat water impermeable. The thickness of the carpet pieces is unimportant. Any type of carpet including, but not limited to, shag, cut pile and loop pile may be converted by suitable means (chopping, shredding, etc.) into carpet pieces of the appropriate dimensions for use in this invention. Carpet may be new or recycled, i.e. previously used as floor covering, or a mixture of new and recycled.

Compost as used herein is defined as a mixture that consists largely of decayed organic matter which is suitable for fertilizing plants. Any compost such as that obtained from yard waste, food waste, animal waste, forest products and mixtures thereof may be used in this invention. Preferred composts are municipal waste compost and sewage sludge-wood chip compost (approximately 1:2 (volume:volume) ratio dewatered secondary treated sewage sludge to wood chips).

Municipal waste compost is comprised of municipal solid waste (garbage with ferrous material, glass and some plastic removed) and dewatered secondary treated sewage sludge typically in approximately a 1:1 (volume:volume) ratio which corresponds to a 3.5:1 dry weight ratio). Up to about a 5:1 (volume:volume) ratio of solid waste to sewage sludge works satisfactorily. The solid waste fraction is typically comprised of about 60 weight percent paper, about 20 weight percent yard waste, about 10 weight percent food waste and about 10 weight percent miscellaneous wood, soil and plastic. Municipal waste compost will retain about 100 percent of its dry weight in water and thus add significant water holding capacity to the sod.

The carpet pieces/compost mixture is comprised of from about 10% to about 50% (by total volume of mixture) carpet pieces and from about 90% to about 50% (by total volume of mixture) compost. A preferred mixture is comprised of about 50% carpet pieces and about 50% compost (by total volume of mixture). Minor amounts of soil, sand or other materials may be added to the mixture depending on local supplies and conditions.

Sod resiliency increases as the carpet component is increased, but available plant nutrients and moisture holding capacity decreases. At low levels of carpet component (i.e. less than about 30% by total volume), it becomes important to use long, thin strips of carpet (e.g. ½ inch by 4 inches vs. 1 inch by 3 inches) in order to improve sod integrity.

Several measurements were performed on a preferred mixture of 50% (by total volume) carpet pieces and 50% (by total volume) municipal waste compost. This mixture had a water infiltration rate of 10 to 20 inches per hour. This contrasts with water infiltration rates of less than one inch per hour for most athletic fields. In terms of enhanced water infiltration, the invention described can be characterized as providing an all-weather playing surface.

The water holding capacity of this preferred mixture of carpet pieces and compost was 85 weight percent based on the dry weight of the mixture.

This preferred mixture of carpet pieces and municipal waste compost generally has a pH of 6.5 to 7.5. An 8 inch depth of this mixture provides 100 to 200 pounds per acre of available nitrogen as well as phosphorous, potassium and micro-nutrients to satisfy the total nutritional requirements of turfgrasses or other plants.

Carpet pieces-compost mixtures can be viewed as manufactured growing media. They can be produced with a physical and chemical uniformity that would be most difficult to achieve with mineral soils. Manufactured growing media utilizing carpet and compost are lightweight (approximately one-third the weight of mineral soil) which minimizes shipping costs from a mixing site to a field construction site. The preferred mixture of carpet pieces and compost described above had a bulk density of about 25 pounds per cubic foot. A typical mineral soil used for athletic field construction would weigh 75 to 100 pounds per cubic foot.

Conventional cultivated sod production practices are not compatible with carpet-compost growing media. Sod cutting or lifting machines would be unable to cleanly cut through the root-carpet pieces compost matrix. This problem can be avoided by growing cultivated sod using carpet pieces-compost media on a root barrier such as that described previously.

When growing sod on a root barrier, the market size of sod pieces should first be established. Since carpet pieces-compost sod has a much lower density than traditional soil-based sod, it follows that individual sod pieces can be larger. This reduces the number of joints or seams.

The method for making the carpet pieces-compost sod of this invention will be illustrated by assuming a sod size of 4 ft. by 50 ft. However, this invention is not limited to this size sod. The skilled practitioner would readily modify the method to make sod of other dimensions.

Figure 2:
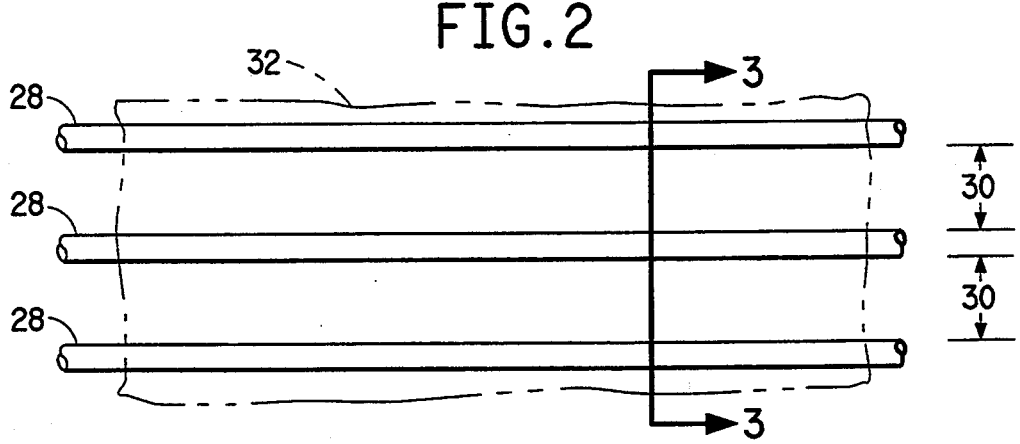
FIG. 2 is a top plan view of the arrangement of dividers used for making sod of this invention.

The first step in the production process is to "mark out" a reasonably level production site. This may be accomplished by placing dividers onto a surface and arranging them four feet apart (sod width) from each other for whatever lengths are necessary in order to meet production goals. Referring to FIG. 2, plastic piping 28 of approximately 1½ in. outside diameter may be used as the dividers. The dividers are securely fastened to the surface in order to maintain the 4 ft. sod width 30 throughout the subsequent process.

Figure 3:
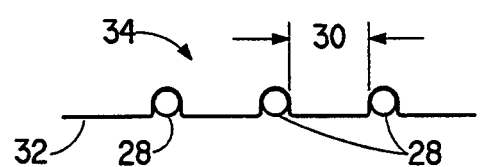
FIG. 3 is a side view, along line 3—3 in FIG. 2 showing the dividers and root impervious film.

Referring to FIG. 3, if the dividers 28 are not placed onto a root impervious surface (such as concrete), a suitable root impervious sheet 32, such as a plastic film, is placed over the dividers and allowed to collapse between the dividers 28 forming a trough 34 for holding the carpet pieces-compost growing media.

Carpet piece-compost mixture is then placed to a settled and firmed depth in the troughs. Preferably, the depth is about one inch. This is the bottom or first layer of the sod. A second layer of compost is placed over the first layer to a depth where no carpet pieces extending upward from the first layer are left uncovered. The depth of the second layer is preferably about ½ inch.

Prior to seeding, a suitable irrigation system may be set up so as to keep the growing media moist, as necessary.

Viable seeds, seedlings, rooted cuttings, root divisions, or plant plugs are placed in the second layer. In one embodiment of the invention, an adapted turfgrass seed mixture (adapted to the soils and climate of the region) is seeded at the rate of about 10 pounds per 1000 square feet for bunch grasses and about 3 pounds per 1000 square feet for fine textured grasses such as Kentucky bluegrass. Seeding may be done by a drop type spreader or by a hydroseeder. After seeding, the seed bed should be rolled and the sod should be watered regularly. Flowers or other plants could readily be substituted for grass in this method.

Grass should be mowed regularly to an acceptable height for the species and climate. After a period of time (depending on plant species and growing conditions) the sod is ready for harvest. During the time prior to harvest, the plants' roots penetrate into the first layer and entangle the carpet pieces as the plants grow. The sod can be rolled by machine without serious damage to the dividers or to the root impervious barrier. Sod can be cut by hand or mechanically during the rolling process. Because the sod is grown on a root impervious barrier, it is harvested with its roots intact unlike conventional sod which may be stressed due to the severing of some of its roots during harvesting.

Sod grown in this manner may be placed in temporary locations such as over a synthetic turf playing field for up to three weeks and then machine rolled and stored on a root impervious barrier for eventual re-use several times without losing its integrity.

TEST METHODS

Water Infiltration Rate
1. Fill a 6-inch diameter, 18-inch long cylinder with carpet pieces/compost blend. Firm by tamping when wet.
2. Place the cylinder on a bed of sand.
3. Add water until the column (cylinder) of carpet pieces/compost is saturated and water moves steadily through the column.
4. Add an excess of water and measure the rate at which it enters the column.

Water Molding Capacity

Carpet pieces/compost mixture samples are placed in 2-inch diameter, 6-inch long PVC tubes which are fitted at one end with aluminum screening. Samples used should have approximately 35% moisture content in order to facilitate packing the sample into the tubes.

Samples are soaked for two hours and then placed on air dry soil for a period of two days. During this time the sample tubes are covered to ensure that any water leaving the tubes moves into the soil by capillary movement and not into the air through evaporation. This technique places approximately one-third atmosphere tension on moisture in the samples and is defined as the upper limit of moisture tension.

Water holding capacity is calculated by using the dry sample weight and the moisture retention at $\frac{1}{3}$ atmosphere.

We claim:

1. A method for producing a sod comprising the steps of:
   a) placing a first layer comprising a mixture of carpet pieces and compost over a root impervious barrier;
   b) placing a second layer comprising compost over said first layer to at least a depth whereby any pieces of carpet extending upward from said first layer are completely covered by said second layer;
   c) placing viable seeds, seedlings, rooted cuttings, root divisions, or plant plugs in said second layer;
   d) watering said seeds, seedlings, rooted cuttings, root divisions, or plant plugs for growth to establish root penetration into said first layer and root entanglement with said carpet pieces, thus forming a sod; and
   e) harvesting the sod.

2. The method of claim 1 wherein said mixture of carpet pieces and compost comprises from about 10% to about 50% by total volume carpet pieces and from about 90% to about 50% by total volume compost.

3. The method of claim 2 wherein said carpet pieces are from about $\frac{1}{2}$ inch to about 1 inch in width and from about 1 inch to about 5 inches in length.

4. Sod comprising:
   a) a first layer comprising a mixture of carpet pieces and compost;
   b) a second layer comprising compost covering said first layer to at least a depth whereby any pieces of carpet extending upward from said first layer are covered by said second layer;
   c) a plurality of plants growing in said second layer, said plants having roots penetrating into said first layer and entangling said carpet pieces.

5. The sod of claim 4 wherein said mixture of carpet pieces and compost comprises from about 10% to about 50% by total volume carpet pieces and from about 90% to about 50% by total volume compost.

6. The sod of claim 5 wherein said mixture of carpet pieces and compost comprises about 50% by total volume carpet pieces and 50% by total volume compost.

7. The sod of claim 5 wherein said carpet pieces are from about $\frac{1}{2}$ inch to about 1 inch in width and from about 1 inch to about 5 inches in length.

8. The sod of claim 5 wherein said first layer has a depth of about 1 inch and wherein said second layer has a depth of about $\frac{1}{2}$ inch.

9. The sod of claim 5 wherein said compost is selected from the group consisting of municipal waste compost and sewage sludge—wood chip compost.

10. The sod of claim 9 wherein said compost is municipal waste compost.

11. The sod of claim 9 wherein said compost is sewage sludge—wood chip compost.

* * * * *